United States Patent
Nohata (10) Patent No.: US 10,811,957 B2
(45) Date of Patent: Oct. 20, 2020

(54) POWER CONVERSION APPARATUS

(71) Applicant: SUBARU CORPORATION, Tokyo (JP)

(72) Inventor: Kohei Nohata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/443,203

(22) Filed: Jun. 17, 2019

(65) Prior Publication Data

US 2020/0076295 A1 Mar. 5, 2020

(30) Foreign Application Priority Data

Aug. 29, 2018 (JP) .................................. 2018-160819

(51) Int. Cl.
*H02M 1/32* (2007.01)
*H02P 27/06* (2006.01)
*H02M 7/537* (2006.01)
*H02M 1/088* (2006.01)

(52) U.S. Cl.
CPC .............. *H02M 1/32* (2013.01); *H02M 1/088* (2013.01); *H02M 7/537* (2013.01); *H02P 27/06* (2013.01)

(58) Field of Classification Search
None
See application file for complete search history.

(56) References Cited

U.S. PATENT DOCUMENTS

| | | | | |
|---|---|---|---|---|
| 4,691,269 A | * | 9/1987 | Yamane | H02M 7/5395 363/132 |
| 5,852,559 A | * | 12/1998 | Li | H02M 5/271 363/163 |
| 6,069,811 A | * | 5/2000 | Moriguchi | H02H 7/1257 363/142 |

(Continued)

FOREIGN PATENT DOCUMENTS

| | | |
|---|---|---|
| JP | 2013-24633 A | 2/2013 |
| JP | 2017-163714 A | 9/2017 |

OTHER PUBLICATIONS

Notice of Reasons for Refusal issued in corresponding Japanese Patent Application No. 2018-160819 dated Apr. 7, 2020, with machine translation.

*Primary Examiner* — Bentsu Ro
(74) *Attorney, Agent, or Firm* — Troutman Pepper Hamilton Sanders LLP (57) ABSTRACT

A power conversion apparatus includes positive-side and negative-side switching elements, positive-side and negative-side gate drive circuits, a capacitor and a gate signal controller. The positive-side switching element is disposed between a positive-side direct-current bus and an output node. The negative-side switching element is disposed between a negative-side direct-current bus and the output node. The gate drive circuits turn on and off the respective switching elements. The capacitor is inserted between the buses. The gate signal controller transmits, to the gate drive circuits, gate signals to instruct turning on or off the switching elements. In response to a start instruction of pre-charge of the capacitor, the gate signal controller transmits a first gate signal to temporarily turn on and then off the positive-side gate drive circuit and transmits a second gate signal to temporarily turn on and then turn off the negative-side gate drive circuit.

7 Claims, 3 Drawing Sheets

(56) References Cited

U.S. PATENT DOCUMENTS

| | | | |
|---|---|---|---|
| 9,490,705 B2 * | 11/2016 | Ito | H02M 3/335 |
| 9,813,009 B1 * | 11/2017 | Xu | B60L 50/51 |
| 2015/0256083 A1 * | 9/2015 | Ito | H02M 3/335 |
| | | | 363/16 |

* cited by examiner

POWER CONVERSION APPARATUS

CROSS-REFERENCE TO RELATED APPLICATIONS

The present application claims priority from Japanese Patent Application No. 2018-160819 filed on Aug. 29, 2018, the entire contents of which are hereby incorporated by reference.

BACKGROUND

The disclosure relates to a power conversion apparatus including switching elements turned on and off by gate drive circuits.

A power conversion apparatus includes pairs of switching elements, and each pair of switching elements are connected in series and inserted between a positive-side direct-current (DC) bus and a negative-side DC bus. An output node is connected between each pair of switching elements connected in series. The positive-side DC bus is connected to the positive electrode of a battery, and the negative-side DC bus is connected to the negative electrode of the battery. A capacitor is inserted between the positive-side DC bus and the negative-side DC bus (between the DC buses).

A main relay is disposed between the battery and the capacitor (an example of the power conversion apparatus). When the main relay is in an off state, the capacitor is discharged to prevent electric shock. When the main relay is turned on, the capacitor after discharged is pre-charged (stores electricity). While the capacitor is being pre-charged, operation of the power conversion apparatus is stopped (see, for example, Japanese Unexamined Patent Application Publication No. 2013-24633).

SUMMARY

An aspect of the disclosure provides a power conversion apparatus including a positive-side switching element, a negative-side switching element, a positive-side gate drive circuit, a negative-side gate drive circuit, a capacitor, and a gate signal controller, and. The positive-side switching element is disposed between a positive-side direct-current bus and an output node. The negative-side switching element is disposed between a negative-side direct-current bus and the output node. The positive-side gate drive circuit is configured to turn on and off the positive-side switching element. The negative-side gate drive circuit is configured to turn on and off the negative-side switching element. The capacitor is inserted between the positive-side direct-current bus and the negative-side direct-current bus. The gate signal controller configured to transmit to the positive-side gate drive circuit a gate signal to instruct turning on and off the positive-side switching element and transmit to the negative-side gate drive circuit a gate signal to instruct turning on and off the negative-side switching element. The gate signal includes a first gate signal to temporarily turn on and then turn off the positive-side switching element, and a second gate signal to temporarily turn on and then turn off the negative-side switching element. The gate signal controller is configured to, in response to an instruction for a start of pre-charge of the capacitor, transmit the first gate signal to the positive-side gate drive circuit and transmit the second gate signal to the negative-side gate drive circuit.

An aspect of the disclosure provides a power conversion apparatus including a positive-side switching element, a negative-side switching element, a positive-side gate drive circuit, a negative-side gate drive circuit, a capacitor, and circuitry. The positive-side switching element is disposed between a positive-side direct-current bus and an output node. The negative-side switching element is disposed between a negative-side direct-current bus and the output node. The positive-side gate drive circuit is configured to turn on and off the positive-side switching element. The negative-side gate drive circuit is configured to turn on and off the negative-side switching element. The capacitor is inserted between the positive-side direct-current bus and the negative-side direct-current bus. The circuitry is configured to transmit to the positive-side gate drive circuit a gate signal to instruct turning on and off the positive-side switching element and transmit to the negative-side gate drive circuit a gate signal to instruct turning on and off the negative-side switching element. The gate signal includes a first gate signal to temporarily turn on and then turn off the positive-side switching element, and a second gate signal to temporarily turn on and then turn off the negative-side switching element. The circuitry is configured to, in response to an instruction for a start of pre-charge of the capacitor, transmit the first gate signal to the positive-side gate drive circuit and transmit the second gate signal to the negative-side gate drive circuit.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. A power conversion apparatus includes gate drive circuits and a gate signal controller. The gate drive circuits are each provided for each switching element. The gate signal controller transmits, to the gate drive circuits, gate signals to instruct turning on and off switching elements. In response to the gate signals, the gate drive circuits turn on and off the switching elements.

In some cases, the gate drive circuits each includes an insulation transformer to insulate the gate signal controller side and the switching element side from each other. Since the insulation transformer does not transmit a DC component on the primary side to the secondary side, the insulation transformer transmits only rising edges and falling edges of pulse-shaped gate signals to the secondary side. In view of this, the gate drive circuit with the insulation transformer includes a latch circuit on the secondary side of the insulation transformer. Upon receipt of a rising edge, the latch circuit maintains the output in a high state (for example, an "ON" state). Upon receipt of a falling edge, the latch circuit maintains the output in a low state (for example, an "OFF" state).

Static electricity may be applied to the gate drive circuits. For example, suppose that a human has touched the power conversion apparatus. In this case, the gate drive circuits may malfunction in spite of a normal gate signal and continue to send an output signal to turn "ON" the switching elements via the latch circuits.

For example, with the main relay being "OFF", when a positive-side switching element and a negative-side switching element are both turned "ON" due to a malfunction caused by static electricity, a short circuit occurs between the DC buses, and the output signal to turn "ON" the switching elements is continuously sent to maintain the short circuit between the DC buses.

With the short circuit between the DC buses, pre-charge causes electrical charge to flow between the DC buses via the short-circuited switching elements, thus hindering accumulation of electrical charge in the capacitor. As a result, the pre-charge is not ended in a predetermined period of time, and a pre-charge abnormality is detected due to timeout.

When the switching elements are turned "ON" due to static electricity in this manner, it is possible to make the switching elements to recover an "OFF" state by returning the output signal of the gate drive circuits to a normal state because the switching elements themselves have no malfunction.

However, when the pre-charge abnormality is detected, a vehicle controller to control pre-charging performance cannot distinguish whether the abnormality is caused by a short-circuit malfunction of switching elements or caused by a malfunction due to static electricity. For this reason, when the pre-charge abnormality is detected, the vehicle controller regards the abnormality as a malfunction of the power conversion apparatus and reacts to the abnormality irrespective of an actual short-circuit cause. This may result in needless replacement or repairs of the power conversion apparatus even in the case of an abnormality that allows the switching elements to recover.

In view of this, it is desirable to provide a power conversion apparatus capable of returning an output signal of a gate drive circuit to a normal state when the gate drive circuit malfunctions due to static electricity.

Figure 1:
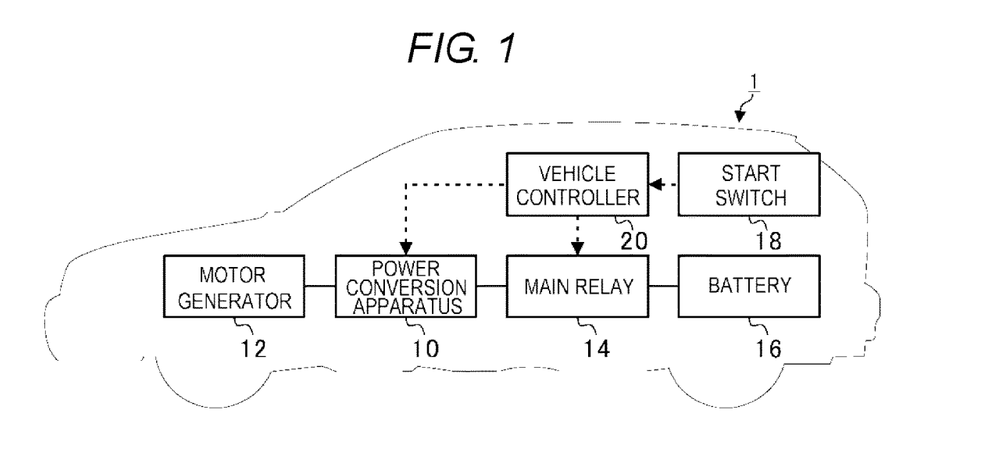
FIG. 1 is a diagram illustrating a configuration of a vehicle to which a power conversion apparatus according to an disclosure of the disclosure is applied.

FIG. 1 is a diagram illustrating a configuration of a vehicle 1 to which a power conversion apparatus 10 according to the embodiment is applied. Elements of the configuration in close relation to the embodiment will be described herein although elements having low relevance to the embodiment will not be elaborated.

The vehicle 1 includes the power conversion apparatus 10, a motor generator 12, a main relay 14, a battery 16, a start switch 18, and a vehicle controller 20. In one implementation, the power conversion apparatus 10 may be an inverter. The vehicle 1 is an electric vehicle with the motor generator 12 as a drive source. However, the vehicle 1 may be a hybrid electric vehicle including an engine as the drive source along with the motor generator 12.

The motor generator 12 is connected to the battery 16 through the power conversion apparatus 10 and the main relay 14. The battery 16 is a secondary battery such as a lithium ion battery. At such a timing as acceleration of the vehicle 1, the power conversion apparatus 10 converts DC power supplied from the battery 16 into alternating-current (AC) power as desired and supplies the AC power to the motor generator 12. At this time, the motor generator 12 mainly functions as an electric motor and drives the vehicle 1 with the AC power supplied from the power conversion apparatus 10. At such a timing as deceleration of the vehicle 1, the battery 16 is charged with (accumulates) the power generated by the motor generator 12 and converted into the DC power by the power conversion apparatus 10.

The main relay 14 switches connection between the power conversion apparatus 10 and the battery 16. Examples of the main relay 14 include an electromagnetic contactor. The start switch 18 receives READY-ON operation and READY-OFF operation by an operator on board.

The vehicle controller 20 includes a semiconductor integrated circuit including elements such as a central processing unit (CPU), a ROM storing programs and the like, and a RAM serving as a work area. The vehicle controller 20 mainly controls drive of the vehicle 1. For example, the vehicle controller 20 controls the power conversion apparatus 10 to control rotation of the motor generator 12. In accordance with an instruction from the start switch 18, the vehicle controller 20 controls opening and closing of the main relay 14.

Figure 2:
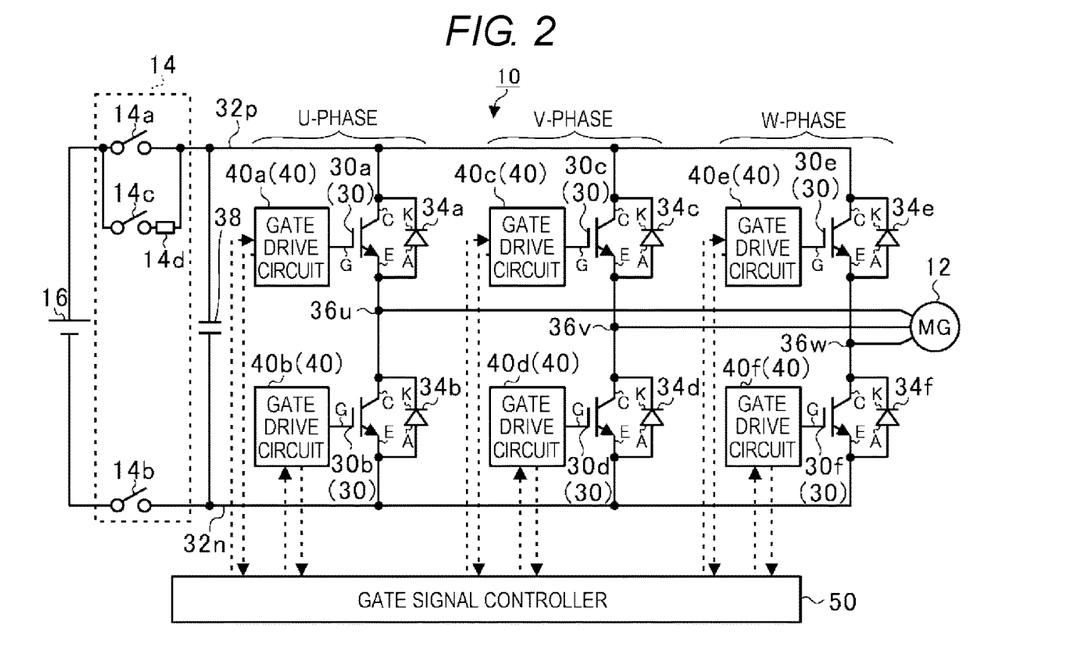
FIG. 2 is a diagram illustrating a configuration of the power conversion apparatus according to the disclosure.

FIG. 2 is a diagram illustrating a configuration of the power conversion apparatus 10 according to the embodiment. The power conversion apparatus 10 includes switching elements 30a, 30b, 30c, 30d, 30e, and 30f, a positive-side DC bus 32p, a negative-side DC bus 32n, flyback diodes 34a, 34b, 34c, 34d, 34e, and 34f, a capacitor 38, gate drive circuits 40a, 40b, 40c, 40d, 40e, and 40f, and a gate signal controller 50.

The switching elements 30a, 30b, 30c, 30d, 30e, and 30f may be hereinafter collectively referred to as switching elements 30. Of the switching elements 30, the switching elements 30a, 30c, and 30e will be occasionally referred to as positive-side switching elements, and the switching elements 30b, 30d, and 30f may be referred to as negative-side switching elements. The gate drive circuits 40a, 40b, 40c, 40d, 40e, and 40f will be collectively referred to as gate drive circuits 40 on occasion. Of the gate drive circuits 40, the gate drive circuits 40a, 40c, and 40e may be referred to as positive-side gate drive circuits, and the gate drive circuits 40b, 40d, and 40f may be referred to as negative-side gate drive circuits. "Between the positive-side DC bus 32p and the negative-side DC bus 32n" may be referred to as "between the DC buses".

The switching elements 30 are, for example, insulated gate bipolar transistors (IGBTs). A collector C of the switching element 30a is connected with the positive-side DC bus 32p. An emitter E of the switching element 30a is connected with a collector C of the switching element 30b. An emitter E of the switching element 30b is connected with the negative-side DC bus 32n.

A collector C of the switching element 30c is connected with the positive-side DC bus 32p. An emitter E of the switching element 30c is connected with a collector C of the switching element 30d. An emitter E of the switching element 30d is connected with the negative-side DC bus 32n.

A collector C of the switching element 30e is connected with the positive-side DC bus 32p. An emitter E of the switching element 30e is connected with a collector C of the switching element 30f. An emitter E of the switching element 30f is connected with the negative-side DC bus 32n.

In other words, the pair of switching elements 30a and 30b connected in series, the pair of switching elements 30c and 30d connected in series, and the pair of switching elements 30e and 30f connected in series are inserted in parallel between the positive-side DC bus 32p and the negative-side DC bus 32n.

A cathode K of the flyback diode 34a is connected with the collector C of the switching element 30a, and an anode A of the flyback diode 34a is connected with the emitter E of the switching element 30a. In other words, the flyback diode 34a is connected in antiparallel to the switching element 30a. Similarly, the flyback diodes 34b, 34c, 34d, 34e, and 34f are respectively connected in antiparallel to the switching elements 30b, 30c, 30d, 30e, and 30f.

A connection node between the emitter E of the switching element 30a and the collector C of the switching element 30b functions as a U-phase output node 36u. Similarly, a connection node between the emitter E of the switching element 30c and the collector C of the switching element 30d functions as a V-phase output node 36v, and a connection node between the emitter E of the switching element 30e and the collector C of the switching element 30f functions as a W-phase output node 36w. The motor generator (MG) 12 is connected to each of the output nodes 36u, 36v, and 36w.

The gate drive circuit 40a is connected with a gate G of the switching element 30a and turns on and off the switching element 30a. Similarly, the gate drive circuit 40b is connected with a gate G of the switching element 30b and turns on and off the switching element 30b. The gate drive circuit 40c is connected with a gate G of the switching element 30c and turns on and off the switching element 30c. The gate drive circuit 40d is connected with a gate G of the switching element 30d and turns on and off the switching element 30d. The gate drive circuit 40e is connected with a gate G of the switching element 30e and turns on and off the switching element 30e. The gate drive circuit 40f is connected with a gate G of the switching element 30f and turns on and off the switching element 30f.

The gate signal controller 50 includes a semiconductor integrated circuit including elements such as a central processing unit (CPU), a ROM storing programs and the like, and a RAM serving as a work area. Under control of the vehicle controller 20, the gate signal controller 50 generates gate signals to instruct turning on and off the switching elements 30 and transmits the generated gate signals to the gate drive circuits 40. The gate signals are, for example, pulse-shaped signals.

The main relay 14 includes main switches 14a, 14b, and 14c, and a resistor 14d. The main switch 14a has one contact connected with the positive electrode of the battery 16 and the other contact connected with the positive-side DC bus 32p. The main switch 14b has one contact connected with the negative electrode of the battery 16 and the other contact connected with the negative-side DC bus 32n. The main switch 14c has one contact connected with the contact of the main switch 14a on the battery 16 side and has the other contact connected to the contact of the main switch 14a on the power conversion apparatus 10 side through the resistor 14d.

The capacitor 38 is inserted between the DC buses, at a position between the main relay 14 and the power conversion apparatus 10. The capacitor 38 smooths voltage between the DC buses.

With this configuration, when the vehicle 1 is READY-OFF (IG-OFF), the main switches 14a, 14b, and 14c are all "OFF (open)", and the capacitor 38 is being discharged. In response to the READY-ON operation by the operator on board, an instruction for starting pre-charge (storing electricity) of the capacitor 38 is transmitted from the start switch 18 to the vehicle controller 20. Upon receipt of the pre-charge start instruction, the vehicle controller 20 starts pre-charge of the capacitor 38. Specifically, the vehicle controller 20 turns "ON (closed)" the main switches 14b and 14c. Thus, the capacitor 38 is gradually charged via the resistor 14d.

The vehicle controller 20 determines whether a voltage of the capacitor 38 becomes equal to or higher than a predetermined voltage in a predetermined period of time. The predetermined period of time is, for example, several seconds, and is set based on a time constant determined by a capacity of the capacitor 38 and a resistance value of the resistor 14d. The predetermined voltage is set at substantially the same level as the voltage of the battery 16 (for example, 95% of the voltage of the battery 16).

When the voltage of the capacitor 38 becomes equal to or higher than the predetermined voltage in the predetermined period of time, the vehicle controller 20 turns "OFF" the main switch 14c to end the pre-charge of the capacitor 38. After that, the vehicle controller 20 turns "ON" the main switch 14a to connect the power conversion apparatus 10 to the battery 16. Thus, the vehicle 1 becomes READY-ON (IG-ON). When the voltage of the capacitor 38 does not become equal to or higher than the predetermined voltage in the predetermined period of time, the vehicle controller 20 determines that the pre-charge abnormality has occurred.

Upon receipt of the pre-charge start instruction, the vehicle controller 20 transmits a pre-charge signal "ON" to the gate signal controller 50. During the pre-charge, the vehicle controller 20 continues to transmit the pre-charge signal "ON". At an end of the pre-charge, the vehicle controller 20 changes the pre-charge signal "ON" to a pre-charge signal "OFF" and transmits the pre-charge signal "OFF" to the gate signal controller 50.

Figure 3:
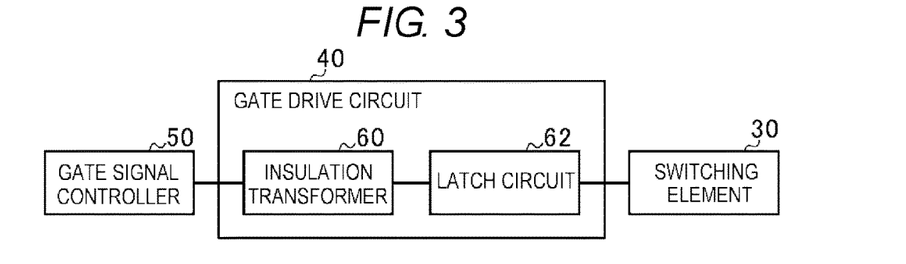
FIG. 3 is a diagram illustrating a configuration of a gate drive circuit.

FIG. 3 is a diagram illustrating a configuration of each of the gate drive circuits 40. The gate drive circuit 40 includes an insulation transformer 60 and a latch circuit 62.

The primary side of the insulation transformer 60 is connected with the gate signal controller 50, and the secondary side of the insulation transformer 60 is connected with the latch circuit 62. The latch circuit 62 is connected with the switching element 30.

The insulation transformer 60 insulates the primary side and the secondary side from each other. Since the insulation transformer 60 does not transmit a DC component on the primary side to the secondary side, the insulation transformer 60 transmits only rising edges and falling edges of the pulse-shaped gate signals to the secondary side.

Upon receipt of a rising edge, the latch circuit 62 maintains the output in a high state (for example, anon state). Upon receipt of a falling edge, the latch circuit 62 maintains the output in a low state (for example, an off state). Thus, the latch circuit 62 outputs to the switching element 30 pulse-shaped output signals based on the rising edges and the falling edges input.

It should be noted that the gate drive circuit 40 may include a short-circuit detector that determines whether current of the switching element 30 is overcurrent so as to detect a short circuit between the DC buses via the switching elements 30. For a predetermined period of time after detecting that a short circuit has occurred, the short-circuit detector may continue to transmit a short-circuit signal "ON" to the gate signal controller 50.

For example, the power conversion apparatus 10, along with such elements as the battery 16 and a DC/DC converter, is accommodated in a metallic case. This case is disposed, for example, below a trunk of the vehicle 1. Although covered with a non-metallic material such as plastics and disposed below the trunk, a part (for example, a metallic part) of the case is unfortunately exposed for a structural reason.

For example, in opening a rear gate of the vehicle 1 and reaching a hand into the trunk, a human may accidentally touch the exposed metallic part of the case containing the power conversion apparatus 10. When the human touches the metallic part, static electricity may be applied to the case, through which static electricity may be transmitted to the gate drive circuit 40 of the power conversion apparatus 10.

In this case, the gate drive circuit 40 may malfunction in spite of a normal gate signal and continue to transmit an output signal to turn "ON" the switching element 30 via the latch circuit 62.

For example, when a positive-side switching element and a negative-side switching element are both turned "ON" due to a malfunction caused by static electricity, a short circuit occurs between the DC buses, and the output signal to turn "ON" the switching elements 30 is continuously sent and maintains the short circuit between the DC buses.

If the capacitor 38 is pre-charged with the short circuit between the DC buses, electrical charge flows between the DC buses via the short-circuited switching elements 30, thus hindering accumulation of electrical charge in the capacitor 38. As a result, the pre-charge is not ended in the predetermined period of time, and a pre-charge abnormality is detected due to timeout.

During the pre-charge, the switching elements 30 are connected in series to the resistor 14d. Consequently, even with the short circuit between the DC buses during the pre-charge, high voltage is not applied to the short-circuited switching elements 30, and overcurrent does not flow. As a result, during the pre-charge, the gate drive circuits 40 fail to detect the short circuit between the DC buses.

When the switching elements are turned "ON" due to static electricity, it is possible to make the switching elements to recover an "OFF" state by returning the output signal of the gate drive circuits to a normal state because the switching elements themselves have no malfunction.

In view of this, in response to the start instruction of pre-charging the capacitor 38, the gate signal controller 50 transmits a first gate signal to temporarily turn on and then turn off the positive-side switching element to the positive-side gate drive circuit and transmits a second gate signal to temporarily turn on and then turn off the negative-side switching element to the negative-side gate drive circuit. The power conversion apparatus 10 uses falling edges of the first gate signal and falling edges of the second gate signal to return the output signal of the gate drive circuits 40 to a normal state to perform the pre-charge normally.

Figure 4:
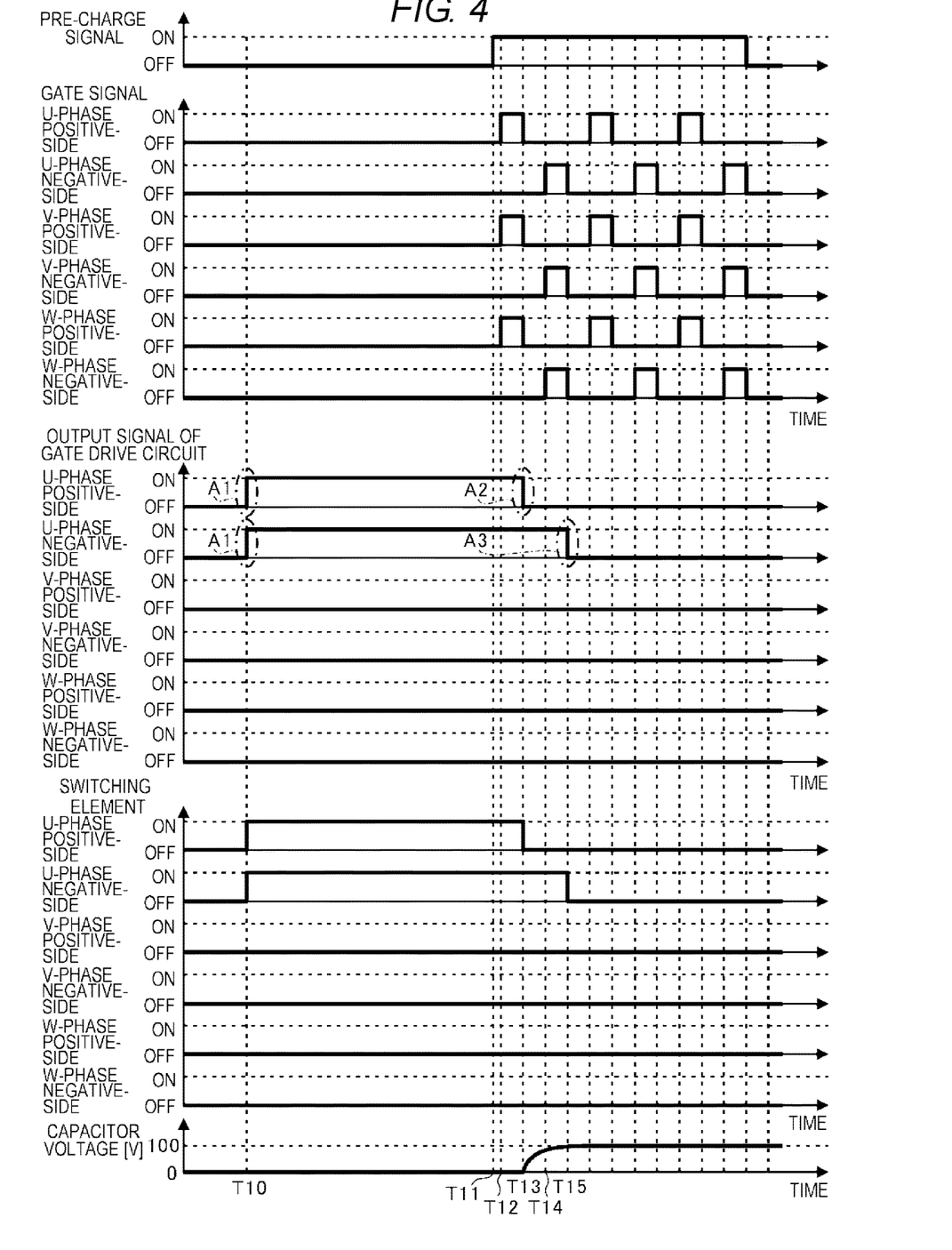
FIG. 4 is a time chart illustrating operation of the power conversion apparatus when static electricity is applied.

FIG. 4 is a time chart illustrating operation of the power conversion apparatus 10 when static electricity is applied. It is assumed, for example, that at time T10, the vehicle 1 is READY-OFF and the capacitor 38 is being discharged. Then, it is further assumed that at the time T10, output signals of the U-phase gate drive circuits 40a and 40b each becomes "ON", as indicated by circles A1 of single chain lines, due to static electricity irrespective of gate signals.

As a result, the U-phase switching elements 30a and 30b are turned "ON" to cause a short circuit between the DC buses via the U-phase switching elements 30a and 30b. At this time, however, because the power conversion apparatus 10 is disconnected from the battery 16, even the short circuit between the DC buses does not make electrical charge flow through the U-phase switching elements 30a and 30b.

At and after the time T10, the U-phase gate drive circuits 40a and 40b continue to send the output signal "ON" via the latch circuits 62. As a result, the U-phase switching elements 30a and 30b are maintained in the "ON" state to keep the DC buses short-circuited via the U-phase switching elements 30a and 30b.

It is assumed that subsequently at time T11, the operator on board performs the READY-ON operation, and that the vehicle controller 20 receives an instruction for starting pre-charge from the start switch 18. At this time, the vehicle controller turns "ON" the main switches 14b and 14c to start pre-charging the capacitor 38 and also transmits the pre-charge signal "ON" to the gate signal controller 50.

At the time T11, because of the short circuit between the DC buses via the U-phase switching elements 30a and 30b, electrical charge supplied from the battery 16 flows between the DC buses via the U-phase switching elements 30a and 30b, thus hindering accumulation of electrical charge in the capacitor 38. Consequently, at the time T11, a voltage of the capacitor 38 is maintained at 0 V.

It is assumed that at time T12 after the time T11, the gate signal controller 50 receives the pre-charge signal "ON". In response to the pre-charge signal "ON", the gate signal controller 50 recognizes that the pre-charge start instruction has been sent. At this time, the gate signal controller 50 transmits a gate signal "ON" to the U-phase positive-side gate drive circuit 40a, the V-phase positive-side gate drive circuit 40c, and the W-phase positive-side gate drive circuit 40e. Then, at time T13 immediately after the time T12, the gate signal controller 50 transmits a gate signal "OFF" to the U-phase positive-side gate drive circuit 40a, the V-phase positive-side gate drive circuit 40c, and the W-phase positive-side gate drive circuit 40e.

In other words, from the time T12 to the time T13, the gate signal controller 50 transmits the first gate signal. It should be noted that a time interval between the gate signals "ON" and "OFF" at this time may be set, for example, at the minimum that allows the gate drive circuits 40 to appropriately recognize the gate signals as pulse signals.

At the time T13, the gate signal transmitted to the U-phase positive-side gate drive circuit 40a is changed from "ON" to "OFF" to input a falling edge to the U-phase positive-side gate drive circuit 40a. This changes the output of the U-phase positive-side latch circuit 62 from a high state to a low state to make the output signal of the U-phase positive-side gate drive circuit 40a "OFF" as indicated by a circle A2 of a single chain line. As a result, the switching element 30a corresponding to the U-phase positive-side gate drive circuit 40a that has been made to malfunction by static electricity is returned to an "OFF" state.

Since the U-phase positive-side switching element 30a is returned to the "OFF" state at the time T13, the DC buses recover from the short circuit. Consequently, at and after the time T13, electrical charge is accumulated in the capacitor 38 to increase the capacitor 38 in voltage. In other words, at and after the time T13, the pre-charge is performed normally.

Subsequently at time T14, the gate signal controller 50 transmits the gate signal "ON" to the U-phase negative-side gate drive circuit 40b, the V-phase negative-side gate drive circuit 40d, and the W-phase negative-side gate drive circuit 40f. Then, at time T15 immediately after the time T14, the gate signal controller 50 transmits the gate signal "OFF" to the U-phase negative-side gate drive circuit 40b, the V-phase negative-side gate drive circuit 40d, and the W-phase negative-side gate drive circuit 40f.

In other words, from the time T14 to the time T15, the gate signal controller 50 transmits the second gate signal. It should be noted that a time interval between the gate signals "ON" and "OFF" at this time may be set, for example, at the minimum that allows the gate drive circuits 40 to appropriately recognize the gate signals as pulse signals.

At the time T15, the gate signal transmitted to the U-phase negative-side gate drive circuit 40b is changed from "ON" to "OFF" to input the falling edge to the U-phase negative-side gate drive circuit 40b. This changes the output of the U-phase negative-side latch circuit 62 from a high state to a low state to make the output signal of the U-phase negative-side gate drive circuit 40b "OFF" as indicated by a circle A3 of a single chain line. As a result, the switching element 30b corresponding to the U-phase negative-side gate drive circuit 40b that has been made to malfunction by static electricity is returned to an "OFF" state.

In this manner, the power conversion apparatus 10 uses the first gate signal to make the positive-side gate drive circuit recover a normal state and uses the second gate signal to make the negative-side gate drive circuit recover a normal state. The gate signal controller 50 transmits the first gate signal and the second gate signal in, for example, 1 millisecond (ms).

When a malfunction occurs anew during pre-charge due to static electricity to bring about another short circuit between the DC buses, electrical charge that has been accumulated in the capacitor 38 partway is discharged through the switching elements 30 in the short-circuited phase. In such a case, the pre-charge may not end in the predetermined period of time.

In view of this, while the pre-charge signal "ON" is being sent (during the pre-charge), the gate signal controller 50 alternately repeats transmission of the first gate signal and transmission of the second gate signal a plurality of times.

Thus, even when a malfunction owing to static electricity occurs anew in the power conversion apparatus 10 during the pre-charge, the first gate signal and the second gate signal enable the switching elements 30 to quickly recover the "OFF" state so as to end the pre-charge in the predetermined period of time.

Then, when the voltage of the capacitor 38 after an elapse of the predetermined period of time is equal to or higher than the predetermined voltage, the vehicle controller 20 ends the pre-charge and transmits a pre-charge signal "OFF" to the gate signal controller 50.

Upon receipt of the pre-charge signal "OFF", the gate signal controller 50 ends the transmission of the first gate signal and the transmission of the second gate signal.

It should be noted that although the case of the short circuit between the DC buses via the U-phase switching elements 30a and 30b has been described with reference to FIG. 4, similar recovery is possible even in the case of a short circuit in the V phase and the W phase. FIG. 4 illustrates that transmission of the first gate signal and transmission of the second gate signal are repeated three times. However, the number of times of repetition is not limited to 3.

An interval between transmission of the first gate signal and transmission of the second gate signal may be shorter than continuation time of the short-circuit signal "ON" transmitted upon detection of a short circuit between the DC buses. This is because when a short circuit occurs between the DC buses during pre-charge, the gate drive circuits 40 fail to detect the short circuit between the DC buses, and the short-circuit signal "ON" is not transmitted from the gate drive circuits 40.

For example, when both of the positive-side switching element and the negative-side switching element have a short-circuit malfunction to cause a short circuit between the DC buses, recovery of the switching elements 30 is not possible. Thus, the pre-charge abnormality is detected in the power conversion apparatus 10. For example, when the positive-side switching element has a short-circuit malfunction, upon transmission of the second gate signal, a short circuit occurs between the DC buses in the power conversion apparatus 10. This hinders progress of the pre-charge, and the pre-charge abnormality is detected. For example, when the negative-side switching element has a short-circuit malfunction, upon transmission of the first gate signal, a short circuit occurs between the DC buses in the power conversion apparatus 10. This hinders progress of the pre-charge, and the pre-charge abnormality is detected. Therefore, detection of the pre-charge abnormality enables the power conversion apparatus 10 to estimate the presence of a short-circuit malfunction in the switching elements 30.

Figure 5:
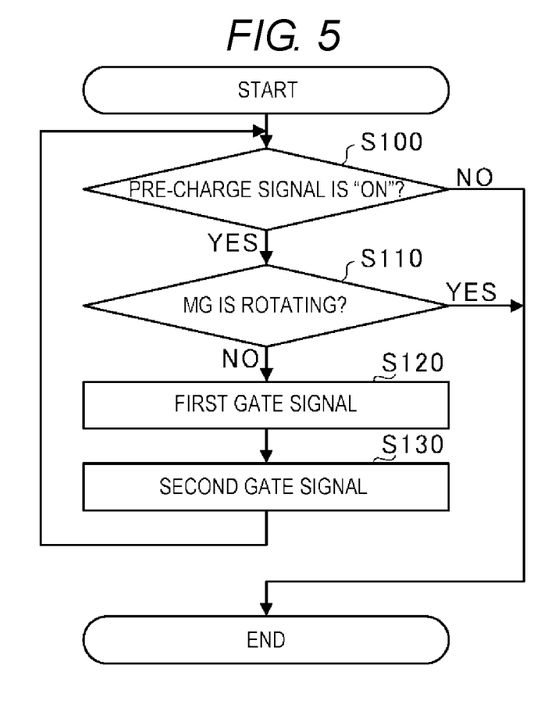
FIG. 5 is a flowchart of an operation procedure of a gate signal controller.

FIG. 5 is a flowchart of an operation procedure of the gate signal controller 50. The gate signal controller 50 determines whether the pre-charge signal is "ON", for example, in a predetermined control cycle (S100). When the pre-charge signal is not "ON" (NO at S100), the gate signal controller 50 ends the series of processing.

When the pre-charge signal is "ON" (YES at S100), the gate signal controller 50 determines whether the motor generator 12 is rotating (S110). It should be noted that rotation of the motor generator 12 may be detected by an encoder disposed at a rotation shaft of the motor generator 12 or may be detected based on a current between the motor generator 12 and the power conversion apparatus 10.

In some cases, while the vehicle 1 is traveling (decelerating), READY-OFF operation is performed, and prior to a stop of the vehicle 1, READY-ON operation is performed again. In this case, because the READY-OFF operation makes the capacitor 38 discharged, the READY-ON operation causes the capacitor 38 to resume pre-charge. During deceleration of the vehicle 1, the motor generator 12 rotates as a generator.

During rotation of the motor generator 12 and during the pre-charge in this manner, transmission of the first gate signal and transmission of the second gate signal may bring about an unfortunate situation in which voltage induced by the motor generator 12 is excessively applied between the DC buses via the power conversion apparatus 10, thereby damaging the capacitor 38 and the battery 16.

In view of this, when the motor generator 12 is rotating (YES at S110), the gate signal controller 50 ends the series of processing without transmission of the first gate signal or transmission of the second gate signal.

When the motor generator 12 is not rotating (NO at S110), the gate signal controller 50 transmits the first gate signal (S120). After that, the gate signal controller 50 transmits the second gate signal (S130) and repeats step S100 and the following steps. Thus, during the pre-charge, transmission of the first gate signal and transmission of the second gate signal are repeated.

As described above, in response to the start instruction of pre-charging the capacitor 38, the power conversion apparatus 10 according to the embodiment transmits the first gate signal to temporarily turn on and then turn off the positive-side switching element to the positive-side gate drive circuit and transmits the second gate signal to temporarily turn on and then turn off the negative-side switching element to the negative-side gate drive circuit.

Therefore, when the gate drive circuits 40 malfunction due to static electricity, the power conversion apparatus 10 according to the embodiment can return the output signal of the gate drive circuits 40 to a normal state. This enables the power conversion apparatus 10 according to the embodiment to return the switching elements 30 to the "OFF" state to normally complete the pre-charge of the capacitor 38.

For example, only one of the positive-side gate drive circuit and the negative-side gate drive circuit may malfunction due to static electricity. In this case, no short circuit occurs between the DC buses, and the pre-charge is normally performed. At this time, when the first gate signal and the second gate signal are not transmitted, the output signal of the malfunctioning gate drive circuits 40 is maintained to be in the "ON" state even after completion of the pre-charge. As a result, normal operation of the power conversion apparatus 10 causes a short circuit between the DC buses.

In the power conversion apparatus 10 according to the embodiment, even when only one of the positive-side gate drive circuit and the negative-side gate drive circuit malfunctions due to static electricity, the first gate signal and the second gate signal are transmitted to return the output signal of the malfunctioning gate drive circuit 40 to a normal state. This makes it possible for the power conversion apparatus 10 according to the embodiment to forestall a short circuit between the DC buses in normal operation of the power conversion apparatus 10.

The gate signal controller 50 transmits the first gate signal and the second gate signal at different transmission timings. This makes it possible for the power conversion apparatus 10 according to the embodiment to avoid a short circuit between the DC buses owing to the transmission timings of the first gate signal and the second gate signal overlapping each other.

During the pre-charge, the gate signal controller 50 alternately repeats transmission of the first gate signal and transmission of the second gate signal a plurality of times. This makes it possible for the power conversion apparatus 10 according to the embodiment to return the output signal of the gate drive circuits 40 to a normal state even when the gate drive circuits 40 malfunction due to static electricity during the pre-charge.

When the motor generator 12 is rotating at a start of the pre-charge, the gate signal controller 50 performs neither transmission of the first gate signal nor transmission of the second gate signal. When the motor generator 12 stops at the start of the pre-charge, the gate signal controller 50 performs transmission of the first gate signal and transmission of the second gate signal. This makes it possible for the power conversion apparatus 10 according to the embodiment to prevent the capacitor 38 and the battery 16 from being damaged in the vehicle 1 to which the power conversion apparatus 10 is applied.

In the vehicle 1 according to the embodiment, an insulation material such as a non-metallic sheet may be disposed on a metallic part of the case housing the power conversion apparatus 10. This configuration eliminates or minimizes static electricity applied to the power conversion apparatus 10.

The embodiment of the disclosure has been described with reference to the accompanying drawings. It should be noted that embodiments of the disclosure are not limited to such an embodiment. It is apparent to those skilled in the art would conceive various modifications and changes within the scope of claims. It is understood that these modifications and changes fall within the technical scope of the disclosure.

For example, during the embodiment-charge, the gate signal controller 50 according to the above-described embodiment alternately repeats transmission of the first gate signal and transmission of the second gate signal a plurality of times. However, the gate signal controller 50 may perform transmission of the first gate signal and transmission of the second gate signal only once at a start of the pre-charge without repeating a plurality of times.

The gate signal controller 50 according to the embodiment performs transmission of the first gate signal and transmission of the second gate signal from the start of the pre-charge to the end of the pre-charge. However, the gate signal controller 50 may perform transmission of the first gate signal and transmission of the second gate signal only in a predetermined term of the pre-charge. For example, the gate signal controller 50 may perform transmission of the first gate signal and transmission of the second gate signal for a predetermined period of time after a predetermined time elapse from receiving the pre-charge signal "ON".

In the above embodiment, after the pre-charge is started (after the main switches 14b and 14c are turned "ON"), transmission of the first gate signal and transmission of the second gate signal are performed. However, the vehicle controller 20 may transmit the pre-charge signal "ON" to the gate signal controller 50 in response to READY-ON operation (the pre-charge start instruction), and after the gate signal controller 50 transmits the first gate signal at least once and transmits the second gate signal at least once, the vehicle controller 20 may turn "ON" the main switches 14b and 14c to start pre-charge.

The gate signal controller 50 according to the embodiment transmits the second gate signal after transmitting the first gate signal. However, the gate signal controller 50 may transmit the first gate signal after transmitting the second gate signal. This makes it also possible to return the output signal of the gate drive circuits 40 to a normal state even when the gate drive circuits 40 malfunction due to static electricity.

The gate signal controller 50 according to the embodiment transmits the first gate signal and the second gate signal at different transmission timings. However, the gate signal controller 50 may transmit the first gate signal and the second gate signal in parallel.

The invention claimed is:
1. A power conversion apparatus comprising:
 a positive-side switching element disposed between a positive-side direct-current bus and an output node;
 a negative-side switching element disposed between a negative-side direct-current bus and the output node;
 a positive-side gate drive circuit configured to turn on and off the positive-side switching element;
 a negative-side gate drive circuit configured to turn on and off the negative-side switching element;

a capacitor inserted between the positive-side direct-current bus and the negative-side direct-current bus; and a gate signal controller configured to transmit to the positive-side gate drive circuit a gate signal to instruct turning on and off the positive-side switching element and transmit to the negative-side gate drive circuit a gate signal to instruct turning on and off the negative-side switching element, wherein the gate signal includes a first gate signal to temporarily turn on and then turn off the positive-side switching element, and a second gate signal to temporarily turn on and then turn off the negative-side switching element, and the gate signal controller is configured to, during a pre-charge of the capacitor, transmit the first gate signal to the positive-side gate drive circuit and transmit the second gate signal to the negative-side gate drive circuit.

2. The power conversion apparatus according to claim 1, wherein the gate signal controller is configured to transmit the first gate signal and the second gate signal at different transmission timings.

3. The power conversion apparatus according to claim 2, wherein during the pre-charge, the gate signal controller alternately repeats the transmission of the first gate signal and the transmission of the second gate signal a plurality of times.

4. The power conversion apparatus according to claim 3, wherein when a motor generator coupled to the output node is rotating at the start of the pre-charge, the gate signal controller performs neither the transmission of the first gate signal nor the transmission of the second gate signal, and when the motor generator stops at the start of the pre-charge, the gate signal controller performs the transmission of the first gate signal and the transmission of the second gate signal.

5. The power conversion apparatus according to claim 1, wherein when a motor generator coupled to the output node is rotating at the start of the pre-charge, the gate signal controller performs neither the transmission of the first gate signal nor the transmission of the second gate signal, and when the motor generator stops at the start of the pre-charge, the gate signal controller performs the transmission of the first gate signal and the transmission of the second gate signal.

6. The power conversion apparatus according to claim 2, wherein when a motor generator coupled to the output node is rotating at the start of the pre-charge, the gate signal controller performs neither the transmission of the first gate signal nor the transmission of the second gate signal, and when the motor generator stops at the start of the pre-charge, the gate signal controller performs the transmission of the first gate signal and the transmission of the second gate signal.

7. A power conversion apparatus comprising:

a positive-side switching element disposed between a positive-side direct-current bus and an output node;

a negative-side switching element disposed between a negative-side direct-current bus and the output node;

a positive-side gate drive circuit configured to turn on and off the positive-side switching element;

a negative-side gate drive circuit configured to turn on and off the negative-side switching element;

a capacitor inserted between the positive-side direct-current bus and the negative-side direct-current bus; and circuitry configured to transmit to the positive-side gate drive circuit a gate signal to instruct turning on and off the positive-side switching element and transmit to the negative-side gate drive circuit a gate signal to instruct turning on and off the negative-side switching element, wherein the gate signal includes a first gate signal to temporarily turn on and then turn off the positive-side switching element, and a second gate signal to temporarily turn on and then turn off the negative-side switching element, and the circuitry is configured to, in response to an instruction for a start of pre-charge of the capacitor, transmit the first gate signal to the positive-side gate drive circuit and transmit the second gate signal to the negative-side gate drive circuit.

\* \* \* \* \*